(12) United States Patent
Yu et al.

(10) Patent No.: US 11,623,511 B2
(45) Date of Patent: Apr. 11, 2023

(54) ELECTRIC DRIVE POWERTRAIN HAVING VERTICALLY-POSITIONED MULTI-STAGE GEARBOXES

(71) Applicant: Jing-Jin Electric Technologies Co., Ltd., Beijing (CN)

(72) Inventors: Ping Yu, Beijing (CN); Jianwen Li, Beijing (CN); Defeng Hou, Beijing (CN); Jiaqi Li, Beijing (CN)

(73) Assignee: Jing-Jin Electric Technologies Co., Ltd., Beijing (CN)

( * ) Notice: Subject to any disclaimer, the term of this patent is extended or adjusted under 35 U.S.C. 154(b) by 160 days.

(21) Appl. No.: 17/250,139

(22) PCT Filed: May 29, 2019

(86) PCT No.: PCT/CN2019/089019
§ 371 (c)(1),
(2) Date: Dec. 4, 2020

(87) PCT Pub. No.: WO2019/233329
PCT Pub. Date: Dec. 12, 2019

(65) Prior Publication Data
US 2021/0229548 A1      Jul. 29, 2021

(30) Foreign Application Priority Data
Jun. 7, 2018   (CN) .......................... 201810581680.9

(51) Int. Cl.
*B60K 17/08* (2006.01)
*B60K 1/00* (2006.01)
*F16H 3/00* (2006.01)

(52) U.S. Cl.
CPC ................ *B60K 17/08* (2013.01); *B60K 1/00* (2013.01); *B60K 2001/001* (2013.01); *F16H 3/006* (2013.01)

(58) Field of Classification Search
CPC .... B60K 17/08; B60K 1/00; B60K 2001/001; F16H 3/006
(Continued)

(56) References Cited

U.S. PATENT DOCUMENTS 5,404,772 A    4/1995  Jester
9,822,860 B2 *  11/2017  Kaltenbach .............. B60K 1/00
(Continued)

FOREIGN PATENT DOCUMENTS

| CN | 102983672 A | 3/2013 |
| CN | 103758943 A | 4/2014 |

(Continued)

*Primary Examiner* — Ha Dinh Ho
(74) *Attorney, Agent, or Firm* — LKGlobal | Lorenz & Kopf, LLP

(57) ABSTRACT

A longitudinal multi-shift electrically driving power assembly, wherein the longitudinal multi-shift electrically driving power assembly includes an electric motor and a plurality of sets of gearboxes, each of the gearboxes is a single-shift reduction gearbox or a multi-shift reduction gearbox, the gearboxes are connected in series to form a gearbox assembly, and an output shaft of the electric motor and an input shaft of the gearbox assembly are integrally manufactured. The power assembly employs the plurality of sets of gearboxes that are connected in series, which improves the performance of the power assembly without adding a power source.

9 Claims, 6 Drawing Sheets

(58) Field of Classification Search
USPC .................................................. 74/321, 331
See application file for complete search history.

(56) References Cited

U.S. PATENT DOCUMENTS

| | | | | |
|---|---|---|---|---|
| 10,968,994 | B2* | 4/2021 | Mittelberger | B60K 1/00 |
| 2010/0173746 | A1* | 7/2010 | Ideshio | B60W 10/11 |
| | | | | 477/36 |
| 2013/0160587 | A1* | 6/2013 | Ibamoto | F16H 3/006 |
| | | | | 74/331 |
| 2015/0375750 | A1* | 12/2015 | Toyota | F16H 59/68 |
| | | | | 701/48 |
| 2016/0017958 | A1 | 1/2016 | Wu et al. | |
| 2017/0037936 | A1* | 2/2017 | Park | F16H 3/089 |

FOREIGN PATENT DOCUMENTS

| | | |
|---|---|---|
| CN | 203906672 U | 10/2014 |
| CN | 104696449 A | 6/2015 |
| CN | 206884716 U | 1/2018 |
| CN | 207173300 U | 4/2018 |
| CN | 207207735 U | 4/2018 |
| CN | 108528185 A | 9/2018 |
| DE | 102011110258 A1 | 12/2011 |
| EP | 1837554 A2 | 9/2007 |
| JP | H09205703 A | 8/1997 |
| JP | 2005253167 A | 9/2005 |
| JP | 2013233877 A | 11/2013 |
| JP | 2016067179 A | 4/2016 |
| JP | 2017065301 A | 4/2017 |
| KR | 20170088669 A | 8/2017 |

* cited by examiner

ELECTRIC DRIVE POWERTRAIN HAVING VERTICALLY-POSITIONED MULTI-STAGE GEARBOXES

CROSS-REFERENCE TO RELATED APPLICATION

This application is a U.S. National-Stage entry under 35 U.S.C. § 371 based on International Application No. PCT/CN2019/089019, filed May 29, 2019 which was published under PCT Article 21(2) and which claims priority to Chinese Application No. 201810581680.9, filed Jun. 7, 2018, which are all hereby incorporated herein by reference in their entirety.

TECHNICAL FIELD

This application pertains to a longitudinal multi-shift electrically driving power assembly, connected to the transmission shaft of a vehicle, for driving the vehicle.

BACKGROUND

Currently, the power characteristics of the electric motors employed by purely electric or hybrid-power new-energy vehicles have gaps with the requirements of the entire vehicles, and cannot satisfy the requirements on the speed ratios and the moments. Because new-energy vehicles are required to handle increasingly more complicated working conditions and road conditions, and the users have raised increasingly more stringent demands on the comprehensive consideration on the maximum vehicle speed and the maximum gradeability of new-energy vehicles, new-energy vehicles that employ the power mode of purely direct driving by an electric motor have become incapable of satisfying the requirements of the industry of new-energy vehicles on the development of vehicles that have comprehensively taken into consideration the high power, the high torque and the maximum vehicle speed.

All of the conventional vehicle power assemblies employ a single-shift transmission, whose output shaft is connected to a transmission shaft. Such a mode, in special cases, is restricted by the capacity of the electric motor, and cannot satisfy at the same time the requirements on high-torque and high-speed performance in conditions such as starting up and climbing. In addition, other objects, desirable features and characteristics will become apparent from the subsequent summary and detailed description, and the appended claims, taken in conjunction with the accompanying drawings and this background.

SUMMARY

Aiming at the above problems in the prior art, the present disclosure provides a longitudinal multi-shift electrically driving power assembly, which employs a plurality of sets of gearboxes that are connected in series, which improves the performance of the power assembly.

To achieve the above object, the technical solutions of the present disclosure are realized as follows:

The present disclosure provides a longitudinal multi-shift electrically driving power assembly, wherein the longitudinal multi-shift electrically driving power assembly comprises an electric motor and a plurality of sets of gearboxes, each of the gearboxes is a single-shift reduction gearbox or a multi-shift reduction gearbox, the gearboxes are connected in series to form a gearbox assembly, and an output shaft of the electric motor and an input shaft of the gearbox assembly are integrally manufactured.

Optionally, a gearbox that is adjacently connected to the electric motor is a single-shift reduction gearbox or a multi-shift reduction gearbox, the output shaft of the electric motor and an input shaft of the adjacent gearbox are integrally manufactured, and a rear cover of the electric motor and a front housing of the adjacent gearbox are integrally manufactured; and when different gearboxes are adjacently connected, an output shaft of a gearbox in front and an input shaft of a gearbox at rear are integrally manufactured or are connected by a shaft coupling.

Optionally, the gearboxes are two sets of gearboxes, and include a single-shift reduction gearbox and a two-shift reduction gearbox that are sequentially connected; or
include a two-shift reduction gearbox and a single-shift reduction gearbox that are sequentially connected; or
include a front two-shift reduction gearbox and a rear two-shift reduction gearbox that are sequentially connected.

Optionally, the gearboxes are three sets of gearboxes, and include a front single-shift reduction gearbox, a two-shift reduction gearbox and a rear single-shift reduction gearbox that are sequentially connected; or
include a single-shift reduction gearbox, a middle two-shift reduction gearbox and a rear two-shift reduction gearbox that are sequentially connected; or
include a front two-gear reduction gearbox, a middle two-gear reduction gearbox and a single-shift reduction gearbox that are sequentially connected; or
include a front two-shift reduction gearbox, a middle two-shift reduction gearbox and a rear two-shift reduction gearbox that are sequentially connected.

Optionally, the gearboxes are four sets of gearboxes, and include a front single-shift reduction gearbox, a middle two-shift reduction gearbox, a rear two-shift reduction gearbox and a rear single-shift reduction gearbox that are sequentially connected.

Optionally, an input shaft and an output shaft are provided in the single-shift reduction gearbox, and each of the input shaft and the output shaft is provided with an engaged transmission gear;

a transmission gear on the input shaft is fixedly connected to the input shaft or is idle-nested to the input shaft, and a transmission gear on the output shaft is fixedly connected to the output shaft or is idle-nested to the output shaft; and a clutch is provided between the input shaft and the transmission gear idle-nested to the input shaft, and a clutch is provided between the output shaft and the transmission gear idle-nested to the output shaft.

Optionally, the input shaft and the output shaft of the gearbox assembly are coaxial, or are non-coaxial and in parallel.

Optionally, the multi-shift reduction gearbox is a two-shift reduction gearbox, an input shaft, one or more intermediate shafts and an output shaft are provided in the two-shift reduction gearbox, each of the input shaft and the intermediate shaft is provided with an engaged transmission gear, each of the intermediate shaft and the output shaft is provided with an engaged transmission gear, the transmission gear on the intermediate shaft is fixedly connected to the intermediate shaft or is idle-nested to the intermediate shaft, and the transmission gear on the output shaft is fixedly connected to the output shaft or is idle-nested to the output shaft.

Optionally, a clutch is provided between the input shaft and the output shaft, a clutch is provided between the intermediate shaft and the transmission gear idle-nested to the intermediate shaft, and the clutch on the intermediate shaft is located between two stages of gears, or is located on an outside of two stages of gears.

Optionally, a bidirectional synchronizer is provided between the input shaft and the output shaft, the transmission gear on the output shaft is idle-nested to the output shaft, and the transmission gear on the intermediate shaft is fixedly connected to the intermediate shaft.

The power assembly, by employing the above structure configuration, has the following advantages:

In the power assembly according to the present disclosure, without adding a power source, the quantity of the shifts of the transmission is increased, a single-shift speed reducer is added or an intermediate shaft is added, whereby the high-efficiency region of the electric motor is better utilized, thereby improving the power performance of the vehicle, reducing the requirement on the maximum torque of the electric motor, reducing the size of the electric motor, and reducing the cost of the electric motor.

The power assembly according to the present disclosure is connected to the rear axle half shaft or the front axle half shaft of the vehicle, can realize transmissions of multiple speed ratios, and has flexible transmission modes and power input modes, which satisfies the demands of the entire vehicle on travelling on different road conditions. When the vehicle is climbing while burdened with a weight, the double-power output and the transmission of the larger speed ratio may be selected, to increase the driving force of the entire vehicle, to overcome the defect of the insufficient driving force of the entire vehicle. When the entire vehicle is in the cruising state, the single power input and the transmission of the smaller speed ratio may be selected, to satisfy the requirement on the high-speed travelling of the entire vehicle, save energy, and increase the endurance mileage of the vehicle.

BRIEF DESCRIPTION OF THE DRAWINGS

The present invention will hereinafter be described in conjunction with the following drawing figures, wherein like numerals denote like elements, and.

Figure 1:
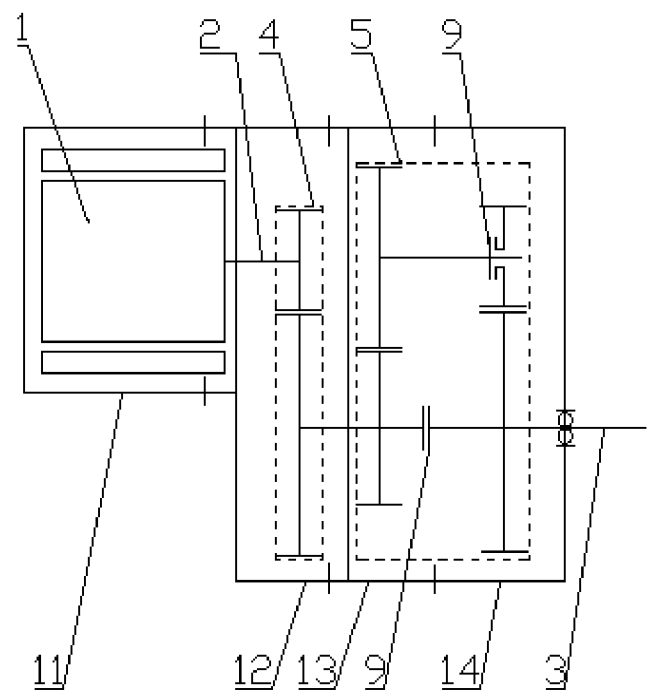
FIG. 1 is a schematic structural diagram of the longitudinal multi-shift electrically driving power assembly with one two-shift gearbox plus one front auxiliary gearbox according to the first embodiment of the present disclosure (wherein the clutch is between the two stages of gears of the two-shift gearbox)

In the drawings: 1. power source; 2. electric-motor-and-transmission input integral shaft; 3. power-assembly output shaft; 4. front auxiliary gearbox; 5. two-shift gearbox; 6. rear auxiliary gearbox; 7. double-intermediate-shaft four-shift gearbox; 8. single-intermediate-shaft four-shift gearbox; 9. electromagnetic clutches; 10. eight-shift gearbox; 11. electric-motor housing; 12. front housing; 13. middle housing; 14. rear housing; and 15. bidirectional synchronizer.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

In order to make the objects, the technical solutions and the advantages of the present disclosure clearer, the embodiments of the present disclosure will be described below in further detail in conjunction with the drawings.

The First Embodiment

As shown in FIG. 1, in the first embodiment of the present disclosure, a longitudinal multi-shift electrically driving power assembly is disclosed, which is particularly a longitudinal two-shift electrically driving power assembly that is added one front auxiliary gearbox. The power assembly comprises a power source 1 (the power source 1 is an electric motor), an electric-motor-and-transmission input integral shaft 2, a power-assembly output shaft 3, a front auxiliary gearbox 4, a two-shift gearbox 5, electromagnetic clutches 9, an electric-motor housing 11, a front housing 12, a middle housing 13 and a rear housing 14.

The electric-motor shaft of the power source 1 and the input shaft of the front auxiliary gearbox 4 are integrated, which is the electric-motor-and-transmission input integral shaft 2. The output shaft of the front auxiliary gearbox 4 and the input shaft of the two-shift gearbox 5 are integrated, and the output shaft of the two-shift gearbox 5 serves as the output shaft of the entire power assembly. The front auxiliary gearbox 4 is a single-shift speed reducer. The two-shift gearbox 5 shifts gear by using two electromagnetic clutches 9. The electric-motor-and-transmission input integral shaft 2 and the power-assembly output shaft 3 are not coaxial and are in parallel, which is a non-coaxial electrically driving power assembly. The gears employed by the front auxiliary gearbox 4 and the two-shift gearbox 5 have a simple arrangement, a small room occupation, a compact structure and a light weight, which satisfies the trend of development of light weight and electrification.

The transmission mode of the first embodiment of the present disclosure is as follows:

When the electromagnetic clutch 9 between the integral shaft of the output of the front auxiliary gearbox 4 and the input of the two-shift gearbox 5 and the power-assembly output shaft 3 is engaged, and simultaneously the electromagnetic clutch 9 on the intermediate shaft of the two-shift gearbox 5 is disengaged, the power source 1 transmits the power via sequentially the electric-motor-and-transmission input integral shaft 2, a pair of gears of the front auxiliary gearbox 4, the integral shaft of the output of the front auxiliary gearbox 4 and the input of the two-shift gearbox 5 to the power-assembly output shaft 3, in which case the longitudinal two-shift electrically driving power assembly is at the top gear. If it is set that the transmission ratio of the front auxiliary gearbox 4 is i1, and the transmission ratio of the two-shift gearbox 5 is i2, then the transmission ratio of the top gear of the longitudinal two-shift electrically driving power assembly is i1.

When the electromagnetic clutch 9 between the integral shaft of the output of the front auxiliary gearbox 4 and the input of the two-shift gearbox 5 and the power-assembly output shaft 3 is disengaged, and simultaneously the electromagnetic clutch 9 on the intermediate shaft of the two-shift gearbox 5 is engaged, the power source 1 transmits the power via sequentially the electric-motor-and-transmission input integral shaft 2, a pair of gears of the front auxiliary gearbox 4, the integral shaft of the output of the front auxiliary gearbox 4 and the input of the two-shift gearbox 5 and two pairs of gears of the two-shift gearbox 5 to the power-assembly output shaft 3, in which case the longitudinal two-shift electrically driving power assembly is at the low gear. If it is set that the transmission ratio of the front auxiliary gearbox 4 is i1, and the transmission ratio of the two-shift gearbox 5 is i2, then the transmission ratio of the low gear of the longitudinal two-shift electrically driving power assembly is i1×i2.

The magnitudes of the transmission ratios of the two-shift gearbox 5 and the front auxiliary gearbox 4 may be changed by changing the sizes or the tooth numbers of the gears, thereby changing the transmission ratio of the longitudinal two-shift electrically driving power assembly.

Figure 2:
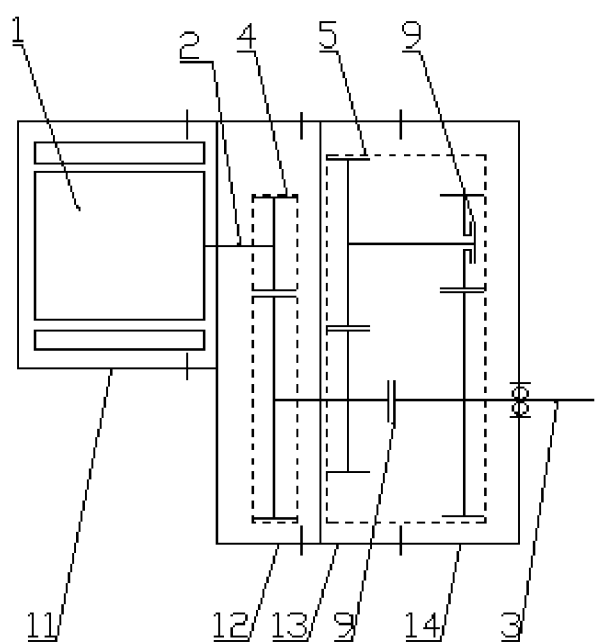
FIG. 2 is a schematic structural diagram of the longitudinal multi-shift electrically driving power assembly with one two-shift gearbox plus one front auxiliary gearbox according to the first embodiment of the present disclosure (wherein the clutch is on the outside of the two stages of gears of the two-shift gearbox)

In addition, another form of the first embodiment of the present disclosure is shown in FIG. 2. FIG. 2 differs from FIG. 1 in that in FIG. 1 the electromagnetic clutch 9 employed by the intermediate shaft of the two-shift gearbox 5 is located between the two stages of gears, while in FIG. 2 the electromagnetic clutch 9 employed by the intermediate shaft of the two-shift gearbox 5 is located on the outside of one of the two stages of gears. Both of the two forms are feasible.

The Second Embodiment

Figure 3:
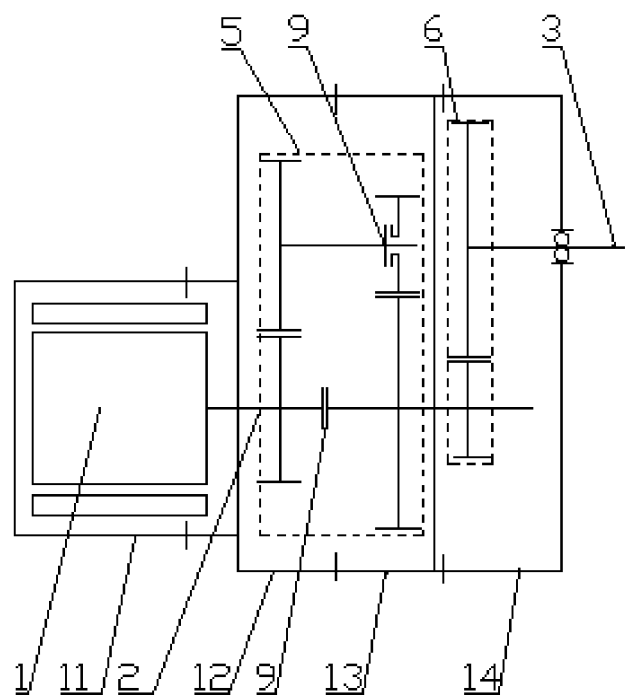
FIG. 3 is a schematic structural diagram of the longitudinal multi-shift electrically driving power assembly with one two-shift gearbox plus one rear auxiliary gearbox according to the second embodiment of the present disclosure.

As shown in FIG. 3, in the second embodiment of the present disclosure, a longitudinal multi-shift electrically driving power assembly is disclosed, which is particularly a longitudinal two-shift electrically driving power assembly that is added one rear auxiliary gearbox. The power assembly comprises a power source 1 (the power source 1 is an electric motor), an electric-motor-and-transmission input integral shaft 2, a power-assembly output shaft 3, a rear auxiliary gearbox 6, a two-shift gearbox 5, electromagnetic clutches 9, an electric-motor housing 11, a front housing 12, a middle housing 13 and a rear housing 14.

The electric-motor shaft of the power source 1 and the input shaft of the two-shift gearbox 5 are integrated, which is the electric-motor-and-transmission input integral shaft 2. The output shaft of the two-shift gearbox 5 and the input shaft of the rear auxiliary gearbox 6 are integrated, and the output shaft of the rear auxiliary gearbox 6 serves as the output shaft of the entire power assembly. The two-shift gearbox 5 shifts gear by using two electromagnetic clutches 9. The rear auxiliary gearbox 6 is a single-shift speed reducer. The electric-motor-and-transmission input integral shaft 2 and the power-assembly output shaft 3 are not coaxial and are in parallel, which is a non-coaxial electrically driving power assembly. The gears employed by the two-shift gearbox 5 and the rear auxiliary gearbox 6 have a simple arrangement, a small room occupation, a compact structure and a light weight, which satisfies the trend of development of light weight and electrification.

The transmission mode of the second embodiment of the present disclosure is as follows:

When the electromagnetic clutch 9 between the electric-motor-and-transmission input integral shaft 2 and the integral shaft of the output of the two-shift gearbox 5 and the input of the rear auxiliary gearbox 6 is engaged, and simultaneously the electromagnetic clutch 9 on the intermediate shaft of the two-shift gearbox 5 is disengaged, the power source 1 transmits the power via sequentially the electric-motor-and-transmission input integral shaft 2, the integral shaft of the output of the two-shift gearbox 5 and the input of the rear auxiliary gearbox 6, and a pair of gears of the rear auxiliary gearbox 6 to the power-assembly output shaft 3, in which case the longitudinal two-shift electrically driving power assembly is at the top gear. If it is set that the transmission ratio of the two-shift gearbox 5 is i2, and the transmission ratio of the rear auxiliary gearbox 6 is i3, then the transmission ratio of the top gear of the longitudinal two-shift electrically driving power assembly is i3.

When the electromagnetic clutch 9 between the electric-motor-and-transmission input integral shaft 2 and the integral shaft of the output of the two-shift gearbox 5 and the input of the rear auxiliary gearbox 6 is disengaged, and simultaneously the electromagnetic clutch 9 on the intermediate shaft of the two-shift gearbox 5 is engaged, the power source 1 transmits the power via sequentially the electric-motor-and-transmission input integral shaft 2, two pairs of gears of the two-shift gearbox 5, the integral shaft of the output of the two-shift gearbox 5 and the input of the rear auxiliary gearbox 6 and a pair of gears of the rear auxiliary gearbox 6 to the power-assembly output shaft 3, in which case the longitudinal two-shift electrically driving power assembly is at the low gear. If it is set that the transmission ratio of the two-shift gearbox 5 is i2, and the transmission ratio of the rear auxiliary gearbox 6 is i3, then the transmission ratio of the low gear of the longitudinal two-shift electrically driving power assembly is i2×i3.

The other contents of the second embodiment of the present disclosure are the same as those of the first embodiment, and are not described repeatedly here.

The Third Embodiment

Figure 4:
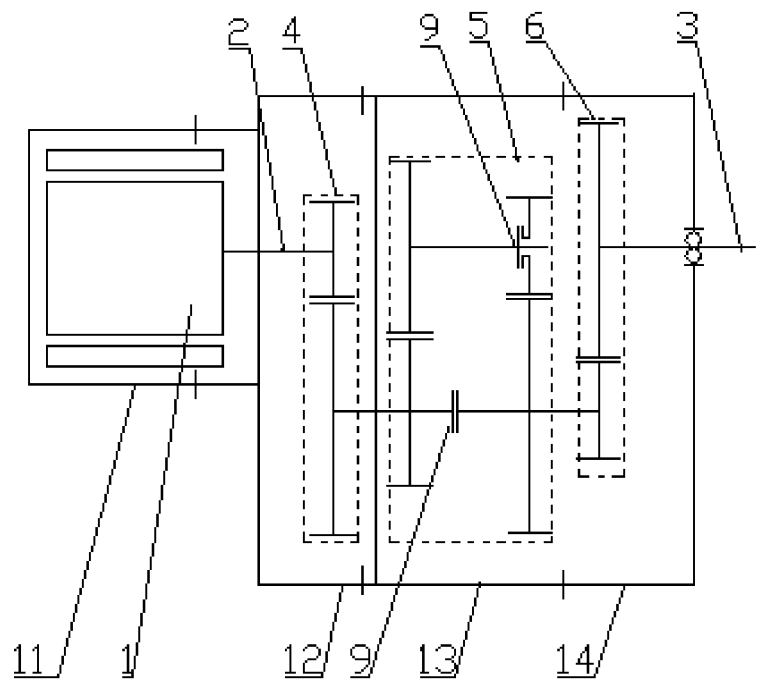
FIG. 4 is a schematic structural diagram of the longitudinal multi-shift electrically driving power assembly with one two-shift gearbox plus one front auxiliary gearbox and one rear auxiliary gearbox according to the third embodiment of the present disclosure.

As shown in FIG. 4, in the third embodiment of the present disclosure, a longitudinal multi-shift electrically driving power assembly is disclosed, which is particularly a longitudinal two-shift electrically driving power assembly that is added one front auxiliary gearbox and one rear auxiliary gearbox. The power assembly comprises a power source 1 (the power source 1 is an electric motor), an electric-motor-and-transmission input integral shaft 2, a power-assembly output shaft 3, a front auxiliary gearbox 4, a rear auxiliary gearbox 6, a two-shift gearbox 5, electromagnetic clutches 9, an electric-motor housing 11, a front housing 12, a middle housing 13 and a rear housing 14.

The electric-motor shaft of the power source 1 and the input shaft of the front auxiliary gearbox 4 are integrated, which is the electric-motor-and-transmission input integral shaft 2. The output shaft of the front auxiliary gearbox 4 and the input shaft of the two-shift gearbox 5 are integrated, the output shaft of the two-shift gearbox 5 and the input shaft of the rear auxiliary gearbox 6 are integrated, and the output shaft of the rear auxiliary gearbox 6 serves as the output shaft of the entire power assembly. The two-shift gearbox 5 shifts gear by using two electromagnetic clutches 9. Both of the front auxiliary gearbox 4 and the rear auxiliary gearbox 6 are a single-shift speed reducer. The electric-motor-and-transmission input integral shaft 2 and the power-assembly output shaft 3 are coaxial, which is a coaxial electrically driving power assembly. The gears employed by the two-shift gearbox 5, the front auxiliary gearbox 4 and the rear auxiliary gearbox 6 have a simple arrangement, a small room occupation, a compact structure and a light weight, which satisfies the trend of development of light weight and electrification.

The transmission mode of the third embodiment of the present disclosure is as follows:

When the electromagnetic clutch 9 between the integral shaft of the output of the front auxiliary gearbox 4 and the input of the two-shift gearbox 5 and the integral shaft of the output of the two-shift gearbox 5 and the input of the rear auxiliary gearbox 6 is engaged, and simultaneously the electromagnetic clutch 9 on the intermediate shaft of the two-shift gearbox 5 is disengaged, the power source 1 transmits the power via sequentially the electric-motor-and-transmission input integral shaft 2, a pair of gears of the front auxiliary gearbox 4, the integral shaft of the output of the front auxiliary gearbox 4 and the input of the two-shift gearbox 5, the integral shaft of the output of the two-shift gearbox 5 and the input of the rear auxiliary gearbox 6, and a pair of gears of the rear auxiliary gearbox 6 to the power-assembly output shaft 3, in which case the longitudinal two-shift electrically driving power assembly is at the top gear. If it is set that the transmission ratio of the front auxiliary gearbox 4 is i1, the transmission ratio of the two-shift gearbox 5 is i2, and the transmission ratio of the rear auxiliary gearbox 6 is i3, then the transmission ratio of the top gear of the longitudinal two-shift electrically driving power assembly is i1×i3.

When the electromagnetic clutch 9 between the integral shaft of the output of the front auxiliary gearbox 4 and the input of the two-shift gearbox 5 and the integral shaft of the output of the two-shift gearbox 5 and the input of the rear auxiliary gearbox 6 is disengaged, and simultaneously the electromagnetic clutch 9 on the intermediate shaft of the two-shift gearbox 5 is engaged, the power source 1 transmits the power via sequentially the electric-motor-and-transmission input integral shaft 2, a pair of gears of the front auxiliary gearbox 4, the integral shaft of the output of the front auxiliary gearbox 4 and the input of the two-shift gearbox 5, two pairs of gears of the two-shift gearbox 5, the integral shaft of the output of the two-shift gearbox 5 and the input of the rear auxiliary gearbox 6, and a pair of gears of the rear auxiliary gearbox 6 to the power-assembly output shaft 3, in which case the longitudinal two-shift electrically driving power assembly is at the low gear. If it is set that the transmission ratio of the front auxiliary gearbox 4 is i1, the transmission ratio of the two-shift gearbox 5 is i2, and the transmission ratio of the rear auxiliary gearbox 6 is i3, then the transmission ratio of the low gear of the longitudinal two-shift electrically driving power assembly is i1×i2×i3.

The other contents of the third embodiment of the present disclosure are the same as those of the first embodiment, and are not described repeatedly here.

The Fourth Embodiment

Figure 5:
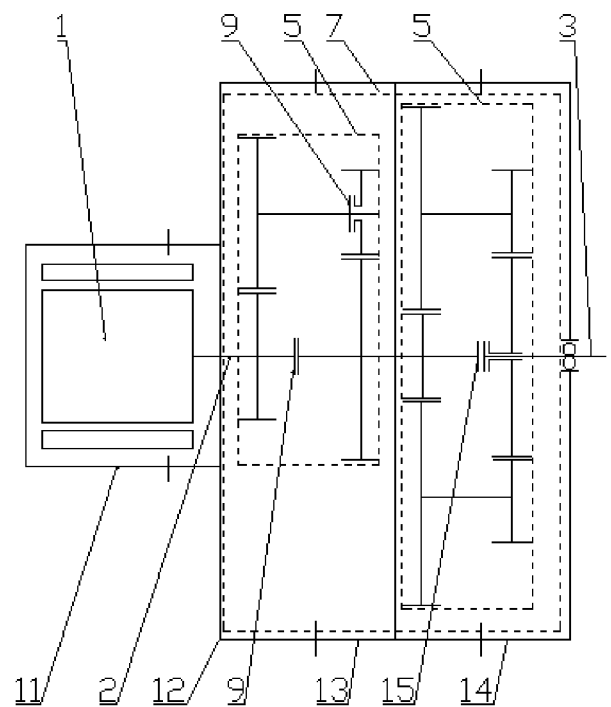
FIG. 5 is a schematic structural diagram of the longitudinal multi-shift electrically driving power assembly with a four-shift gearbox according to the fourth embodiment of the present disclosure (four pairs of gears, wherein the rear two-shift gearbox has double intermediate shafts)

As shown in FIG. 5, in the fourth embodiment of the present disclosure, a longitudinal multi-shift electrically driving power assembly is disclosed, which is particularly a longitudinal four-shift electrically driving power assembly. The power assembly comprises a power source 1 (the power source 1 is an electric motor), an electric-motor-and-transmission input integral shaft 2, a power-assembly output shaft 3, a double-intermediate-shaft four-shift gearbox 7, electromagnetic clutches 9, an electric-motor housing 11, a front housing 12, a middle housing 13, a rear housing 14 and a bidirectional synchronizer 15.

The electric-motor shaft of the power source 1 and the input shaft of the double-intermediate-shaft four-shift gearbox 7 are integrated, which is the electric-motor-and-transmission input integral shaft 2. The output shaft of the double-intermediate-shaft four-shift gearbox 7 serves as the output shaft of the entire power assembly. The double-intermediate-shaft four-shift gearbox 7 shifts gear by using two electromagnetic clutches 9 and one bidirectional synchronizer 15. The double-intermediate-shaft four-shift gearbox 7 is formed by one front two-shift gearbox 5 and one rear two-shift gearbox 5, and the output shaft of the front two-shift gearbox 5 and the input shaft of the rear two-shift gearbox 5 are integrated. The rear two-shift gearbox 5 has two intermediate shafts; in other words, the rear two-shift gearbox is a double-intermediate-shaft two-shift gearbox.

Therefore, the entire four-shift gearbox is a double-intermediate-shaft four-shift gearbox.

The transmission mode of the fourth embodiment of the present disclosure is as follows:

When the electromagnetic clutch 9 between the electric-motor-and-transmission input integral shaft 2 and the integral shaft of the output of the front two-shift gearbox 5 and the input of the rear two-shift gearbox 5 is engaged, the integral shaft of the output of the front two-shift gearbox 5 and the input of the rear two-shift gearbox 5 is engaged with the power-assembly output shaft 3 by the action of the bidirectional synchronizer 15, and simultaneously the electromagnetic clutch 9 on the intermediate shaft of the front two-shift gearbox 5 is disengaged, the power source 1 transmits the power via sequentially the electric-motor-and-transmission input integral shaft 2 and the integral shaft of the output of the front two-shift gearbox 5 and the input of the rear two-shift gearbox 5 to the power-assembly output shaft 3, in which case the longitudinal four-shift electrically driving power assembly is at the first gear, i.e., the directly linking gear. Then the transmission ratio of the first gear of the longitudinal four-shift electrically driving power assembly is 1.

When the electromagnetic clutch 9 between the electric-motor-and-transmission input integral shaft 2 and the integral shaft of the output of the front two-shift gearbox 5 and the input of the rear two-shift gearbox 5 is engaged, a second-stage gearwheel of the two-shift gearbox 5 is engaged with the power-assembly output shaft 3 by the action of the bidirectional synchronizer 15, and simultaneously the electromagnetic clutch 9 on the intermediate shaft of the front two-shift gearbox 5 is disengaged, the power source 1 transmits the power via sequentially the electric-motor-and-transmission input integral shaft 2, the integral shaft of the output of the front two-shift gearbox 5 and the input of the rear two-shift gearbox 5 and two pairs of gears of the rear two-shift gearbox 5 to the power-assembly output shaft 3, in which case the longitudinal four-shift electrically driving power assembly is at the second gear. If it is set that the transmission ratio of the front two-shift gearbox 5 is i4, and the transmission ratio of the rear two-shift gearbox 5 is i5, then the transmission ratio of the second gear of the longitudinal four-shift electrically driving power assembly is i5.

When the electromagnetic clutch 9 between the electric-motor-and-transmission input integral shaft 2 and the integral shaft of the output of the front two-shift gearbox 5 and the input of the rear two-shift gearbox 5 is disengaged, the integral shaft of the output of the front two-shift gearbox 5 and the input of the rear two-shift gearbox 5 is engaged with the power-assembly output shaft 3 by the action of the bidirectional synchronizer 15, and simultaneously the electromagnetic clutch 9 on the intermediate shaft of the front two-shift gearbox 5 is engaged, the power source 1 transmits the power via sequentially the electric-motor-and-transmission input integral shaft 2, two pairs of gears of the front two-shift gearbox 5, and the integral shaft of the output of the front two-shift gearbox 5 and the input of the rear two-shift gearbox 5 to the power-assembly output shaft 3, in which case the longitudinal four-shift electrically driving power assembly is at the third gear. If it is set that the transmission ratio of the front two-shift gearbox 5 is i4, and the transmission ratio of the rear two-shift gearbox 5 is i5, then the transmission ratio of the third gear of the longitudinal four-shift electrically driving power assembly is i4.

When the electromagnetic clutch 9 between the electric-motor-and-transmission input integral shaft 2 and the integral shaft of the output of the front two-shift gearbox 5 and the input of the rear two-shift gearbox 5 is disengaged, a second-stage gearwheel of the two-shift gearbox 5 is engaged with the power-assembly output shaft 3 by the action of the bidirectional synchronizer 15, and simultaneously the electromagnetic clutch 9 on the intermediate shaft of the front two-shift gearbox 5 is engaged, the power source 1 transmits the power via sequentially the electric-motor-and-transmission input integral shaft 2, two pairs of gears of the front two-shift gearbox 5, the integral shaft of the output of the front two-shift gearbox 5 and the input of the rear two-shift gearbox 5, and two pairs of gears of the rear two-shift gearbox 5 to the power-assembly output shaft 3, in which case the longitudinal four-shift electrically driving power assembly is at the fourth gear. If it is set that the transmission ratio of the front two-shift gearbox 5 is i4, and the transmission ratio of the rear two-shift gearbox 5 is i5, then the transmission ratio of the fourth gear of the longitudinal four-shift electrically driving power assembly is i4×i5.

Figure 6:
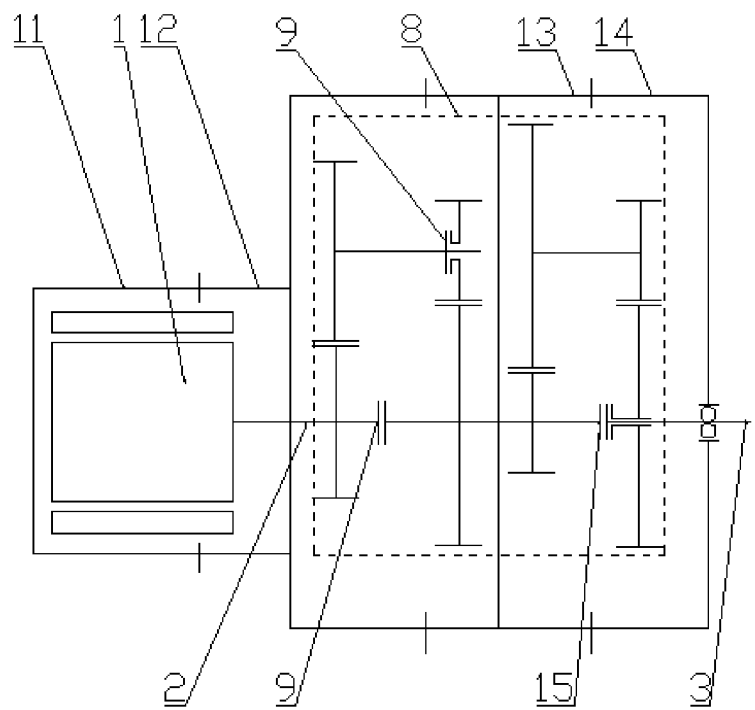
FIG. 6 is a schematic structural diagram of the longitudinal multi-shift electrically driving power assembly with a four-shift gearbox according to the fourth embodiment of the present disclosure (four pairs of gears, and a single intermediate shaft)

FIG. 6 shows another form of the fourth embodiment of the present disclosure. FIG. 6 differs from FIG. 5 in that FIG. 5, on the basis of FIG. 6, is added one intermediate shaft, which can increase the output torque and reduce the cost of the electric motor.

Figure 7:
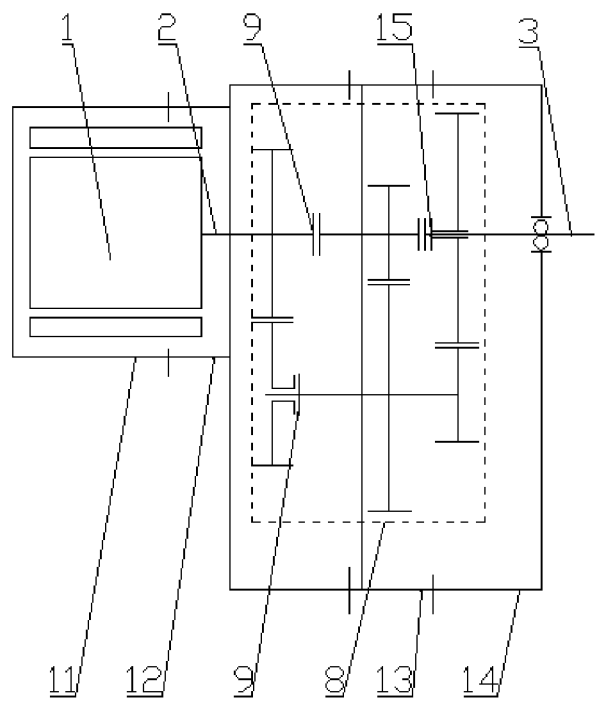
FIG. 7 is a schematic structural diagram of the longitudinal multi-shift electrically driving power assembly with a four-shift gearbox according to the fourth embodiment of the present disclosure (three pair of gears, wherein the input shaft and the output shaft of the gearbox assembly are driven coaxially)
Figure 8:
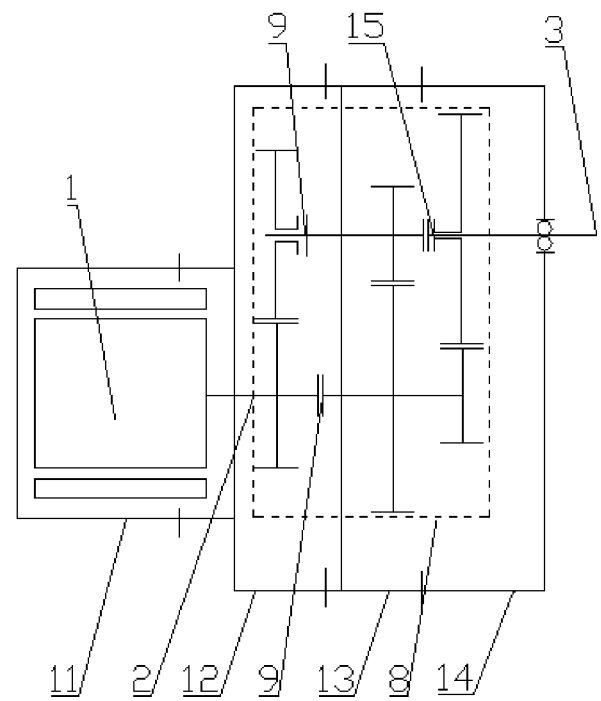
FIG. 8 is a schematic structural diagram of the longitudinal multi-shift electrically driving power assembly with a four-shift gearbox according to the fourth embodiment of the present disclosure (three pair of gears, wherein the input shaft and the output shaft of the gearbox assembly are driven non-coaxially)

FIGS. 7 and 8 show another form of the fourth embodiment of the present disclosure. The four-shift gearbox in FIGS. 7 and 8 employs three pairs of gears, which is less than those of the four-shift gearbox in FIGS. 5 and 6 by one pair of gears. In FIG. 7 the electric-motor-and-transmission input integral shaft 2 and the power-assembly output shaft 3 are coaxial, which is a coaxial electrically driving power assembly. In FIG. 8 the electric-motor-and-transmission input integral shaft 2 and the power-assembly output shaft 3 are not coaxial and are in parallel, which is a non-coaxial electrically driving power assembly.

The other contents of the fourth embodiment of the present disclosure are the same as those of the first embodiment, and are not described repeatedly here.

The Fifth Embodiment

Figure 9:
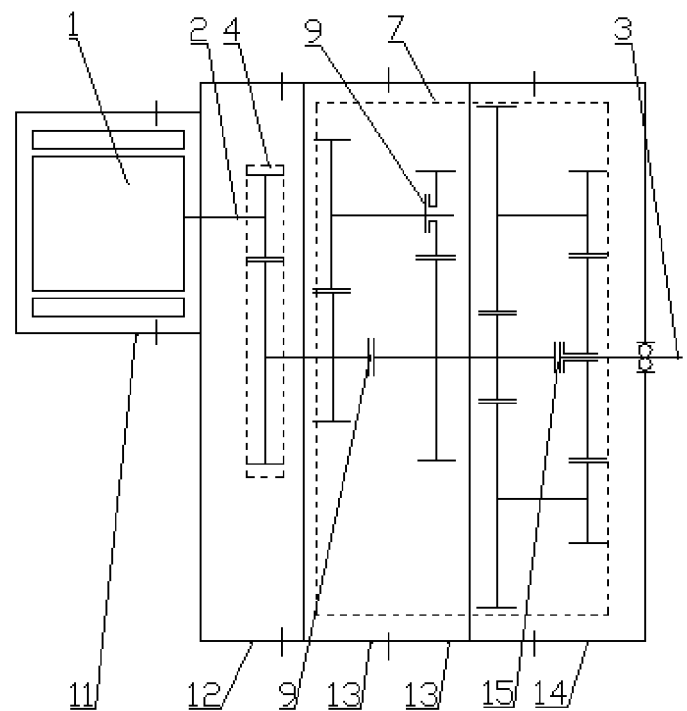
FIG. 9 is a schematic structural diagram of the longitudinal multi-shift electrically driving power assembly with one four-shift gearbox plus one front auxiliary gearbox according to the fifth embodiment of the present disclosure (wherein the rear two-shift gearbox has double intermediate shafts)

As shown in FIG. 9, in the fifth embodiment of the present disclosure, a longitudinal multi-shift electrically driving power assembly is disclosed, which is particularly a longitudinal four-shift electrically driving power assembly that is added one front auxiliary gearbox. The fifth embodiment of the present disclosure is equivalent to changing, on the basis of the first embodiment, the two-shift gearbox into a four-shift gearbox, or is equivalent to adding, on the basis of the first embodiment, a rear two-shift auxiliary gearbox at the rear of the two-shift gearbox. The output shaft of the front auxiliary gearbox 4 and the input shaft of the double-intermediate-shaft four-shift gearbox 7 are integrated, and the output shaft of the double-intermediate-shaft four-shift gearbox 7 serves as the output shaft of the entire power assembly. The particular embodiment may refer to the first embodiment and the fourth embodiment.

The Sixth Embodiment

Figure 10:
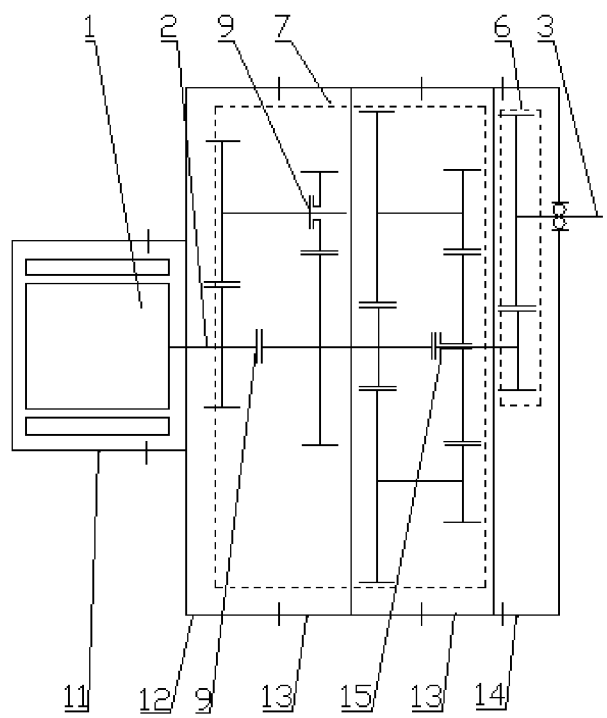
FIG. 10 is a schematic structural diagram of the longitudinal multi-shift electrically driving power assembly with one four-shift gearbox plus one rear auxiliary gearbox according to the sixth embodiment of the present disclosure (wherein the middle two-shift gearbox has double intermediate shafts)

As shown in FIG. 10, in the sixth embodiment of the present disclosure, a longitudinal multi-shift electrically driving power assembly is disclosed, which is particularly a longitudinal four-shift electrically driving power assembly that is added one rear auxiliary gearbox. The sixth embodiment of the present disclosure is equivalent to changing, on the basis of the second embodiment, the two-shift gearbox into a four-shift gearbox, or is equivalent to adding, on the basis of the second embodiment, a front two-shift auxiliary gearbox in front of the two-shift gearbox. The output shaft of the double-intermediate-shaft four-shift gearbox 7 and the input shaft of the rear auxiliary gearbox 6 are integrated, and the output shaft of the rear auxiliary gearbox 6 serves as the output shaft of the entire power assembly. The particular embodiment may refer to the second embodiment and the fourth embodiment.

The Seventh Embodiment

Figure 11:
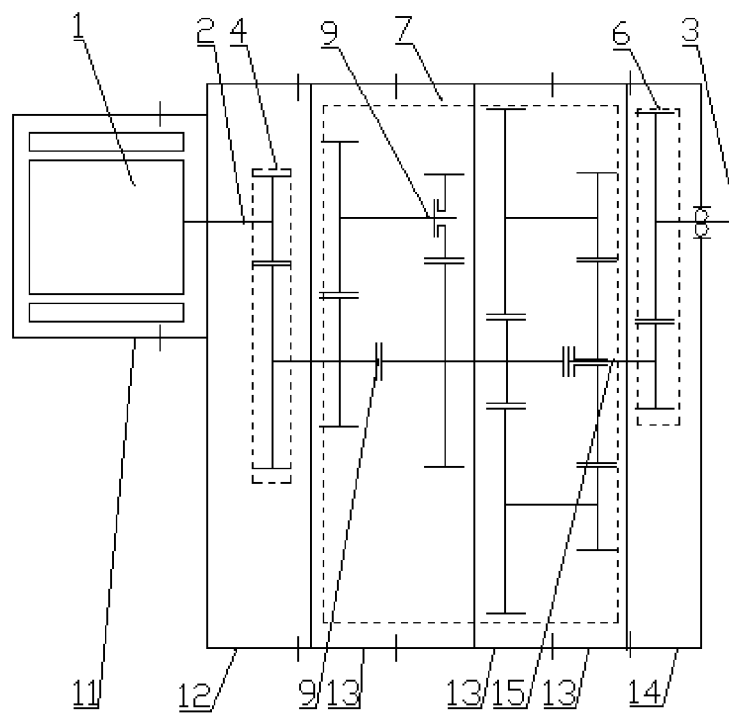
FIG. 11 is a schematic structural diagram of the longitudinal multi-shift electrically driving power assembly with one four-shift gearbox plus one front auxiliary gearbox and one rear auxiliary gearbox according to the seventh embodiment of the present disclosure (wherein the rear two-shift gearbox has double intermediate shafts)

As shown in FIG. 11, in the seventh embodiment of the present disclosure, a longitudinal multi-shift electrically driving power assembly is disclosed, which is particularly a longitudinal four-shift electrically driving power assembly that is added one front auxiliary gearbox and one rear auxiliary gearbox. The seventh embodiment of the present disclosure is equivalent to changing, on the basis of the third embodiment, the two-shift gearbox into a four-shift gearbox. The output shaft of the front auxiliary gearbox 4 and the input shaft of the double-intermediate-shaft four-shift gearbox 7 are integrated, the output shaft of the double-intermediate-shaft four-shift gearbox 7 and the input shaft of the rear auxiliary gearbox 6 are integrated, and the output shaft of the rear auxiliary gearbox 6 serves as the output shaft of the entire power assembly. The particular embodiment may refer to the third embodiment and the fourth embodiment.

The Eighth Embodiment

Figure 12:
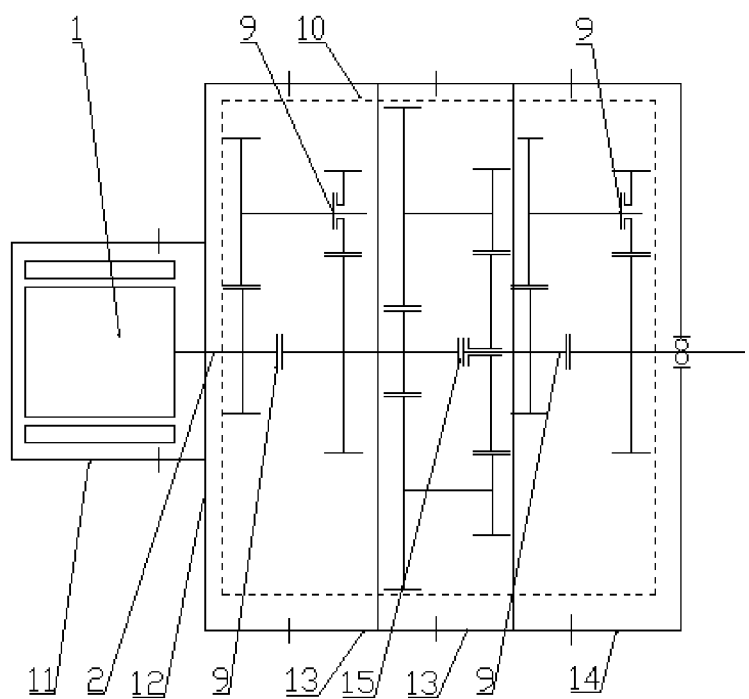
FIG. 12 is a schematic structural diagram of the longitudinal multi-shift electrically driving power assembly with an eight-shift gearbox according to the eighth embodiment of the present disclosure (wherein the middle two-shift gearbox has double intermediate shafts).

As shown in FIG. 12, in the eighth embodiment of the present disclosure, a longitudinal multi-shift electrically driving power assembly is disclosed, which is particularly a longitudinal eight-shift electrically driving power assembly. The eighth embodiment of the present disclosure is equivalent to adding, on the basis of the fourth embodiment, one rear two-shift auxiliary gearbox at the rear of the double-intermediate-shaft four-shift gearbox 7, or is equivalent to changing, on the basis of the third embodiment, the single-shift speed reducer serving as the front auxiliary gearbox and the rear auxiliary gearbox into a front two-shift auxiliary gearbox and a rear two-shift auxiliary gearbox. The particular embodiment may refer to the third embodiment and the fourth embodiment.

The above are merely particular embodiments of the present disclosure. By the teaching of the present disclosure, a person skilled in the art can make other modifications or variations on the basis of the above embodiments. A person skilled in the art should understand that the above particular descriptions are only for the purpose of better interpreting the present disclosure, and the protection scope of the present disclosure should be subject to the protection scope of the claims.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A longitudinal multi-shift electrically driving power assembly, wherein the longitudinal multi-shift electrically driving power assembly comprises an electric motor and a plurality of sets of gearboxes, each of the gearboxes is a single-shift reduction gearbox or a multi-shift reduction gearbox, the gearboxes are connected in series to form a gearbox assembly, and an output shaft of the electric motor and an input shaft of the gearbox assembly are integrally manufactured, an input shaft and an output shaft are provided in the single-shift reduction gearbox, and each of the input shaft and the output shaft is provided with an engaged transmission gear;

the transmission gear on the input shaft is fixedly connected to the input shaft or is idle-nested to the input shaft, and the transmission gear on the output shaft is fixedly connected to the output shaft or is idle-nested to the output shaft; and a clutch is provided between the input shaft and the transmission gear idle-nested to the input shaft, and a clutch is provided between the output shaft and the transmission gear idle-nested to the output shaft.

2. The longitudinal multi-shift electrically driving power assembly according to claim 1, wherein a gearbox that is adjacently connected to the electric motor is a single-shift reduction gearbox or a multi-shift reduction gearbox, the output shaft of the electric motor and an input shaft of the adjacent gearbox are integrally manufactured, and a rear cover of the electric motor and a front housing of the adjacent gearbox are integrally manufactured; and when different gearboxes are adjacently connected, an output shaft of a gearbox in front and an input shaft of a gearbox at rear are integrally manufactured or are connected by a shaft coupling.

3. The longitudinal multi-shift electrically driving power assembly according to claim 1, wherein the gearboxes are two sets of gearboxes, and include a single-shift reduction gearbox and a two-shift reduction gearbox that are sequentially connected; or include a two-shift reduction gearbox and a single-shift reduction gearbox that are sequentially connected; or include a front two-shift reduction gearbox and a rear two-shift reduction gearbox that are sequentially connected.

4. The longitudinal multi-shift electrically driving power assembly according to claim 1, wherein the gearboxes are three sets of gearboxes, and include a front single-shift reduction gearbox, a two-shift reduction gearbox and a rear single-shift reduction gearbox that are sequentially connected; or include a single-shift reduction gearbox, a middle two-shift reduction gearbox and a rear two-shift reduction gearbox that are sequentially connected; or include a front two-shift reduction gearbox, a middle two-shift reduction gearbox and a single-shift reduction gearbox that are sequentially connected; or include a front two-shift reduction gearbox, a middle two-shift reduction gearbox and a rear two-shift reduction gearbox that are sequentially connected.

5. The longitudinal multi-shift electrically driving power assembly according to claim 1, wherein the gearboxes are four sets of gearboxes, and include a front single-shift reduction gearbox, a middle two-shift reduction gearbox, a rear two-shift reduction gearbox and a rear single-shift reduction gearbox that are sequentially connected.

6. The longitudinal multi-shift electrically driving power assembly according to claim 1, wherein the input shaft and an output shaft of the gearbox assembly are coaxial, or are non-coaxial and in parallel.

7. The longitudinal multi-shift electrically driving power assembly according to claim 1, wherein the multi-shift reduction gearbox is a two-shift reduction gearbox, an input shaft, one or more intermediate shafts and an output shaft are provided in the two-shift reduction gearbox, each of the input shaft and the intermediate shaft is provided with an engaged transmission gear, each of the intermediate shaft and the output shaft is provided with an engaged transmission gear, the transmission gear on the intermediate shaft is fixedly connected to the intermediate shaft or is idle-nested to the intermediate shaft, and the transmission gear on the output shaft is fixedly connected to the output shaft or is idle-nested to the output shaft.

8. The longitudinal multi-shift electrically driving power assembly according to claim 7, wherein a clutch is provided between the input shaft and the output shaft, a clutch is provided between the intermediate shaft and the transmission gear idle-nested to the intermediate shaft, and the clutch on the intermediate shaft are located between two stages of gears, or are located on an outside of two stages of gears.

9. The longitudinal multi-shift electrically driving power assembly according to claim 7, wherein a bidirectional synchronizer is provided between the input shaft and the output shaft, a transmission gear on the output shaft is idle-nested to the output shaft, and a transmission gear on the intermediate shaft is fixedly connected to the intermediate shaft.

\* \* \* \* \*